United States Patent [19]

Blau

[11] Patent Number: 5,302,942
[45] Date of Patent: Apr. 12, 1994

[54] LIGHT CURTAIN SYSTEM WITH INDIVIDUAL BEAM INDICATORS AND METHOD OF OPERATION

[75] Inventor: David Blau, Cupertino, Calif.
[73] Assignee: Scientific Technologies Incorporated, Hayward, Calif.
[21] Appl. No.: 978,597
[22] Filed: Nov. 19, 1992
[51] Int. Cl.$^5$ .................. G08B 13/18; G08B 29/00
[52] U.S. Cl. .................. 340/556; 250/221; 340/540; 340/691
[58] Field of Search .................. 340/556, 691, 540; 250/221, 208.4

[56] References Cited

U.S. PATENT DOCUMENTS

| | | | |
|---|---|---|---|
| 2,299,798 | 10/1942 | Colson et al. | 250/221 |
| 2,900,521 | 8/1959 | Eames | 250/208.4 |
| 3,704,396 | 11/1972 | Macdonald | 361/175 |
| 3,746,863 | 7/1973 | Pronovost | 250/561 |
| 3,805,061 | 4/1974 | De Missimy et al. | 250/208.3 |
| 3,810,148 | 4/1974 | Karsten et al. | 340/323 B |
| 4,015,122 | 3/1977 | Rubinstein | 250/221 |
| 4,266,124 | 5/1981 | Weber | 250/221 |
| 4,749,853 | 6/1988 | Salim | 250/221 |
| 4,763,903 | 8/1988 | Goodwin et al. | 273/371 |
| 4,818,866 | 4/1989 | Weber | 250/221 |
| 5,015,840 | 5/1991 | Blau | 250/221 |

*Primary Examiner*—Glen Swann
*Attorney, Agent, or Firm*—Flehr, Hohbach, Test, Albritton & Herbert

[57] ABSTRACT

A light curtain system and method of operation includes a control circuit having visible light indicators positioned adjacent channels of individual light beams established across a guard zone. The light beams are transmitted along a plurality of parallel channels between a transmitter bar and receive bar. The control circuit operates to sense when one or more beams are blocked by the intrusion of an opaque object. The circuit responds by operating visible light LEDs which are positioned adjacent the channels of the blocked beams. The visible light provides continuous feedback to the machine operator as to the condition of the guard zone. The visible light indicators are also used to facilitate alignment of the transmitter and receiver bars.

7 Claims, 4 Drawing Sheets

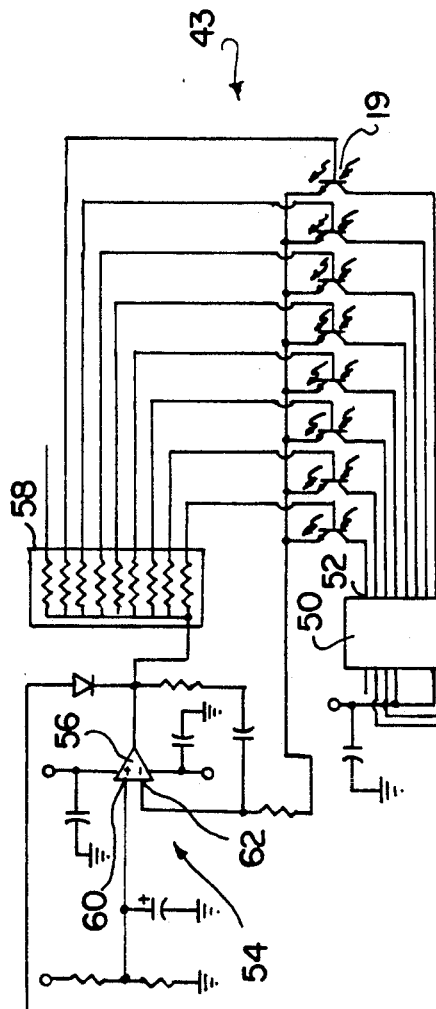
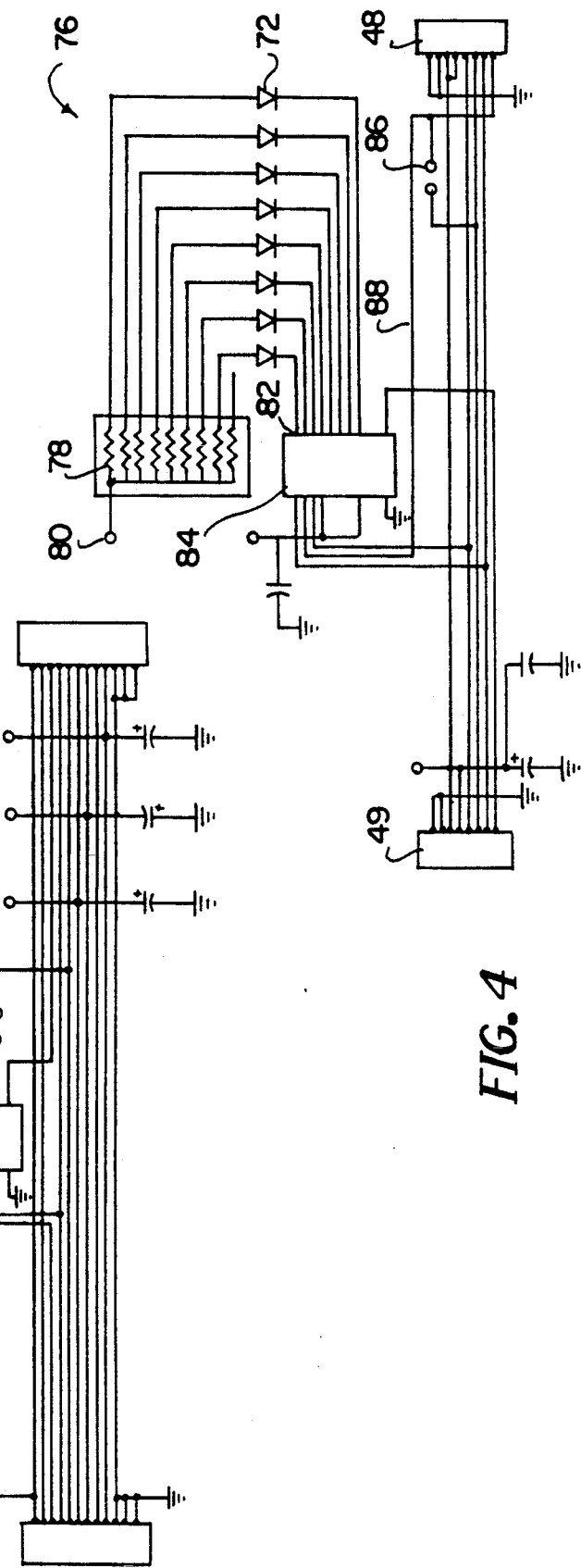
FIG. 3
FIG. 4

LIGHT CURTAIN SYSTEM WITH INDIVIDUAL BEAM INDICATORS AND METHOD OF OPERATION

BACKGROUND OF THE INVENTION

1. Field of the Invention

This invention relates in general to light curtain systems for detecting the movement or intrusion of objects into guarded zones. More particularly, the invention relates to light curtain systems which provide protection for human operators who are working with machines and other industrial equipment.

2. Description of the Related Art

Light curtains employing infrared beams are used to provide operator safety in a variety of industrial applications. Light curtains typically are employed for operator protection around machinery such as punch presses, brakes, molding machines, automatic assembly equipment, coil winding machinery, robot operation, diecasting operations and the like. The prior art light curtains typically employ light emitting diodes (LEDs) mounted at spaced positions along a transmitter bar at one side of the guard zone and phototransistors (PTs) mounted along a receiver bar at the opposite side of the zone. The LEDs transmit modulated infrared light beams along separate parallel channels to the PTs at the receiver bar. If one or more beam is blocked by penetration by an opaque object, such the operator's arm, the control circuit either shuts the machine down, prevents the machine from cycling or otherwise safeguards the area.

The typical existing light curtain system incorporates a control panel having a series of visible indicator lights. One of the lights is red for indicating that at least one of the beams is blocked so that the machine is prevented from cycling, and another light is green for indicating that no objects penetrate the guard area so that the machine can cycle. The control panel can also contain lights used for diagnostic purposes, such for indicating a power supply fault, for indicating receiver fault, for indicating transmitter fault or for indicating alignment. In the case where the machine cycling is interrupted by penetration of an opaque object, removal of the object causes the green indicator on the control panel to go on so that the operator can restart the cycle by pushing buttons or other controls provided outside the guard area.

For purposes of safety it is important that a condition should not arise in which the control panel shows the green indicator when it should show red, which would be an unsafe state. However, there are many possible failures that can arise in the machine and control circuitry which can cause such an unsafe state.

With the prior art light curtains the operator does not necessarily know what the real condition or problem is when the red light is observed on the control panel. Because the operator cannot see the invisible infrared beams, the presence of the red light on the panel would not tell him whether it was red because a beam was broken or whether some circuit or alignment problem caused it to go red.

When light curtain equipment is installed, replaced or re-aligned, a skilled technician is normally required to do the work. The alignment job is relatively difficult, especially where the transmitter and receiver bars are provided with lenses to form narrow beam angles. Because there is no feedback from the individual beams to the technician, it is difficult to adjust the transmitter and receiver bars until the single green light on the control panel comes on to indicate alignment.

The prior art includes light curtain systems having control panels with lights or other indicators related to individual beams for use by the technician in diagnosing and debugging problems, such as why the individual beam is not functioning. Such a system does not, however, provide feedback to the machine operator of the conditions in the guard area.

OBJECTS AND SUMMARY OF THE INVENTION

Accordingly, it is a principal object of the present invention to provide an improved light curtain system and method of operation which gives the machine operator continuous visual feedback of conditions in the guard area.

Another object is to provide a light curtain system and method of the type described which employs visible light signals closely associated with the individual infrared beam channels so that the operator has instantaneous feedback as to whether the guard area is safe or unsafe for the machine to cycle.

Another object is to provide a light curtain system and method of the type described in which individual light indicators are provided for each infrared beam to provide visual feedback on a continuously updated basis on conditions in the guard area.

Another object is to provide a light curtain system and method of the type described which facilitates alignment of the infrared light beams and which also facilitates diagnosis of problems that may arise in the system.

The invention in summary provides a light curtain system and method having a light transmitter which transmits light beams along parallel channels along a guard zone to a light receiver. Indicator lights are mounted closely adjacent the channels and control means is provided for operating the indicator lights to display visible light signals adjacent the beams in the channels which are broken. The visible indicator lights are in positions where the operator can observe them and receive continuous feedback of conditions in the guard area.

The foregoing and additional objects and features of the invention will appear from the following specification in which the several embodiments have been set forth in detail in conjunction with the accompanying drawings.

BRIEF DESCRIPTION OF THE DRAWINGS

FIG. 3 is a schematic block diagram of the control circuit for one segment of the light receivers which are incorporated in the control system of FIG. 2;

FIG. 4 is a schematic block diagram of the control circuit for one segment of the visible light indicators employed in the control system of FIGS. 2 and 3;

DESCRIPTION OF THE PREFERRED EMBODIMENTS

Figure 1:
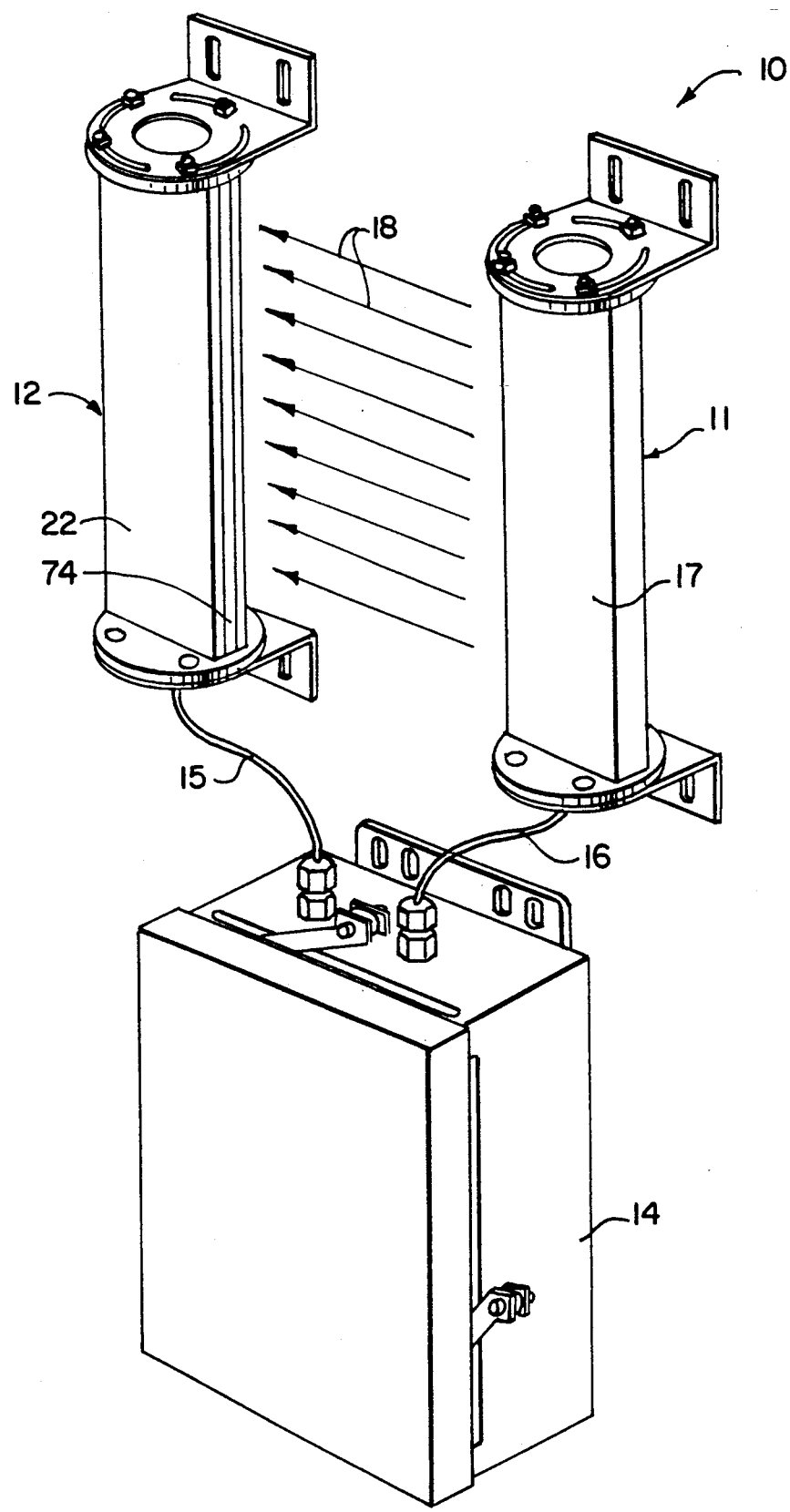
FIG. 1 is a fragmentary perspective view showing the light curtain system in accordance with one embodiment of the invention.

In the drawings FIG. 1 illustrates generally at 10 components of a light curtain system incorporating one embodiment of the invention. The light curtain system includes a light transmitter 11 and light receiver 12 which are operated by the control system 13 shown generally in the block diagram of FIG. 2. A control box 14 houses certain of the control system components and is connected to the transmitter and receiver through cables 15 and 16.

Light transmitter 11 is comprised of a plurality of light sources, preferably LEDs, not shown, which emit modulated, invisible pulses of infrared light beams responsive to the control circuit. The LEDs are mounted in spaced-apart relationship along a transmitter bar, also not shown, which is fitted within a housing 17. The spacing or pitch between the LEDs is predetermined and defines the space between the parallel channels 18 along which the beams are directed. The area encompassed by the beams defines the guard zone. The LEDs are focused by collimating lenses, not shown, into narrow angle beams to minimize the effects of light scattering.

Figure 5:
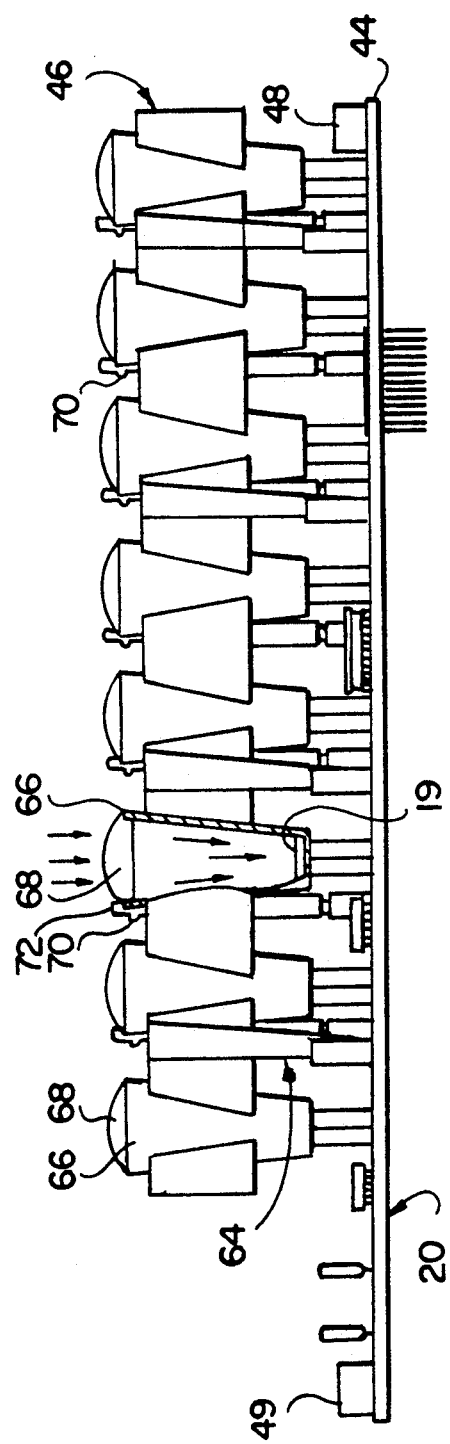
FIG. 5 is a side elevation view illustrating components of one segment of the receiver bar employing the control circuits of FIGS. 3 and 4.

Light receiver 12 is comprised of a plurality of PTs 19 which are mounted in spaced-apart relationship along a receiver bar 20 (FIG. 5). The receiver bar is fitted within a housing 22 which is located at the guard zone on a side opposite that of the transmitter housing. Preferably the number of light receiving PTs is equal to the number of light transmitting LEDs, with each PT associated with the LED of a respective channel. At the work place the transmitter and receiver housings are installed so that the PTs and LEDs are substantially in optical alignment. Typically the transmitter and receiver housings are mounted upright in a vertical plane between the machine and operator, although other configurations could be employed, depending upon the requirements and conditions of a particular application.

While the operation of the embodiments of this invention will be described by the use of infrared light, it is understood that other embodiments of the invention contemplate the use of other radiant energy for the beams, for example near-infrared. It is also understood that other embodiments contemplate that a plurality of the transmitter/receiver pairs may be combined in tandem to protect a relatively larger zone or area.

Figure 2:
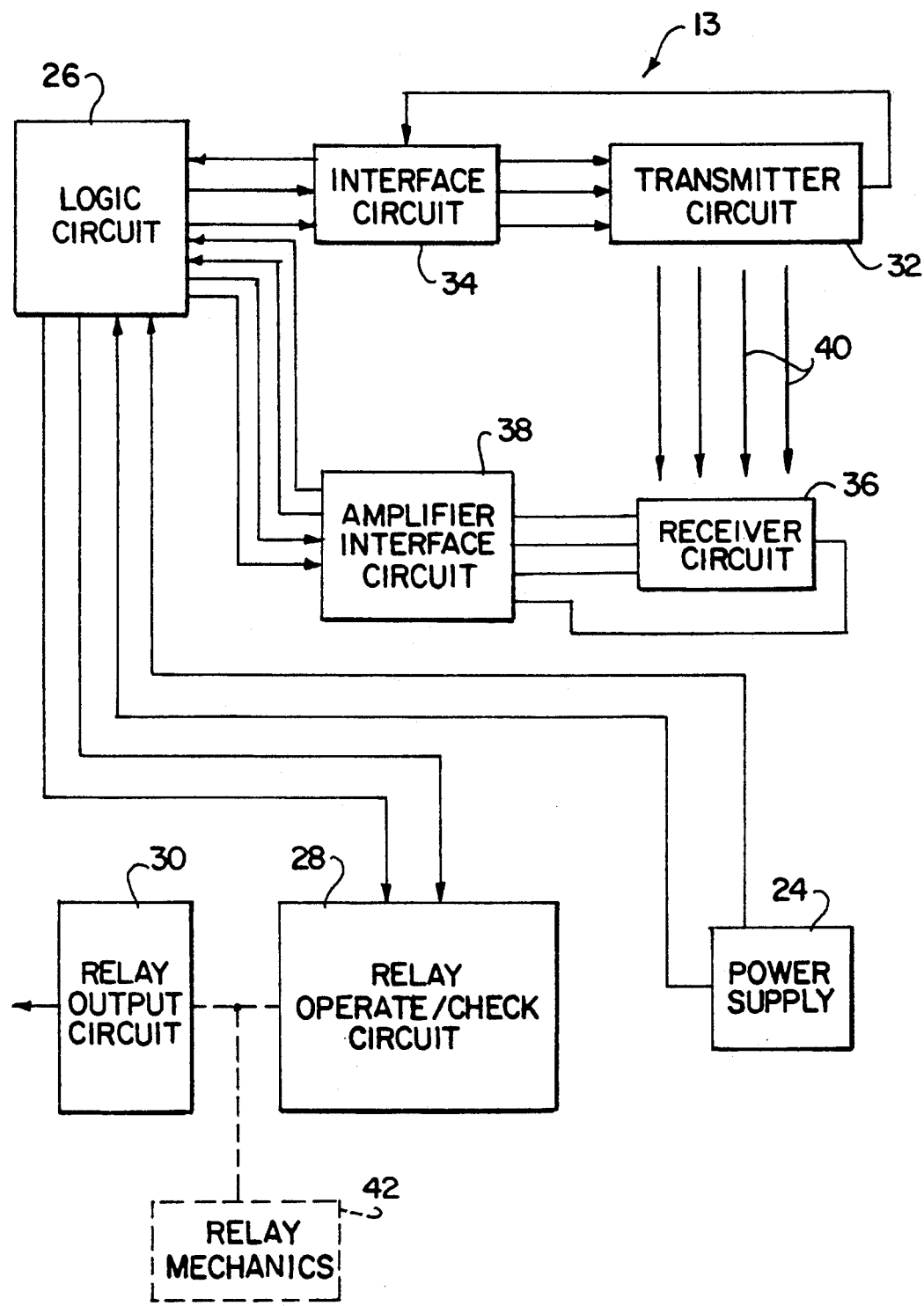
FIG. 2 is a block diagram illustrating the major components of the electrical control system for the light curtain of FIG. 1.

FIG. 2 illustrates the major components of control circuit 13 in block diagram form. The control circuit includes a power supply 24, logic circuit 26, relay operate/check circuit 28, relay output circuit 30, transmitter circuit 32 which is connected to the logic circuit through an interface circuit 34, and receiver circuit 36 which is connected to the logic circuit through amplifier/interface circuit 38. The lines 40 represent the paths of the light beams which project across the guard zone from the transmitter LEDs to the receiver PTs. Box 42 represents the relay mechanics which are actuated responsive to the control circuit to either shut the machine down, prevent it from cycling, or otherwise safeguard the area to protect the operator from injury.

The principal circuit components and mode of operation for control circuit 13 are generally in accordance with the disclosure of U.S. Pat. No. 5,015,840 titled Self-Checking Light Curtain System and Method of Operation which is assigned to Scientific Technologies Incorporated, and which is incorporated herein by reference. Receiver circuit 36 of the present invention is modified over the compatible circuit of that patent in accordance with FIGS. 3 and 4, as explained in more detail below. Logic circuit 26 of the present invention is also modified over the patent's logic circuit in the manner explained below.

FIG. 3 is a diagram of a circuit 43 for eight of the receiver PTs 19 which are mounted on the single circuit card 44 incorporated in the receiver assembly 46 shown in FIG. 5. The circuit 43 forms one segment of the overall receiver circuit 36. End connector sockets 48 and 49 are provided on opposite ends of the card so that a plurality of the cards and assemblies can be concatenated together to form an extended receiver unit. At the end of the unit a similar card and receiver assembly would be provided with only one connector socket. The total number of receiver PTs in the extended unit would depend upon the number of cards and receiver assemblies concatenated together for the particular application.

Circuit 43 includes a shift register 50 having eight terminals 52, each of which is connected with the collector of a respective one of the eight PTs 19. A single amplifier circuit 54 is provided for each receiver card. In the circuit 54 the output terminal of an operational amplifier 56 is connected in parallel with resistors 58 to the bases of the PTs. Terminal 60 of the operational amplifier is normally maintained at +2.5 volts. Feedback from the emitters of the PTs is directed to operational amplifier terminal 62.

FIG. 5 illustrates details of receiver assembly 46. A molded plastic support 64 is provided with sockets 66 which are spaced apart center-to-center at the same pitch as that of the beam channels. Each socket contains one of the PTs 19, and a beam focusing lens 68 is mounted on each socket above the respective PT to focus the incoming beam onto the PT's light collecting surface. Each socket is formed with an outwardly projecting tine 70, and each tine mounts a LED 72 which emits visible light when energized. Each LED is enclosed by a red-colored glass or plastic bulb to provide a colored indicator light signal. The LEDs are mounted in close association with the respective beam paths. As an example for a typical application using a 6.4 mm radius focusing lenses, the center-to-center spacing between each focusing lens and the LED bulb would be 8.9 mm.

Receiver housing 22 is mounted around support structure 64 and the circuit card. As shown in FIG. 1, an elongate window formed in the housing over the focusing lenses mounts a bezel 74. The bezel is formed of a suitable translucent material which passes both infrared and visible light. A deep red color for the bezel material is suitable for this purpose. The red-colored bezel also passes the red light from the indicator lamps, which is the appropriate color for indicating an unsafe condition of the guard area. The red coloration of the bezel also serves to filter out interference from ambient light, sunlight, strobe, weld and other light sources.

While the indicator lights and associated control circuit will be described as mounted on receiver 12 in association with the PTs, the invention also encompasses mounting of the visible light indicators on transmitter 11 in association with the LEDs.

FIG. 4 illustrates details of control circuit 76 for the indicator lights. The eight visible light-emitting LEDs 72 are connected through pull up resistors 78 with power supply terminal 80, and are also connected with respective terminals 82 of a shift register 84. The shift register is coupled through connector sockets 48 and 49 at opposite ends of the circuit card for connecting with the visible LED circuits, not shown, of the other circuit boards that are concatenated together in the receiver. Circuit 76 can be adapted for use in the last card of the series by shorting the jumper 86, which is in the line 88 providing the lamp data input signal into shift register 82.

The lamp data input signal for shift register 82 and the other visible light shift registers in the concatenation is generated by logic circuit 26 of FIG. 1. The circuitry and mode of operation of logic circuit 26 is generally in accordance with the disclosure of U.S. Pat. No. 5,015,840, with the exception that the circuit is modified so that it shifts the data bits down to visible light shift registers 84 in predetermined timed relationship with the timing of shift registers 50 for the PTs in the receivers. The databits are shifted at a suitable clocked rate, such as 200 $\mu$s per channel. In control circuit 76 the visible lamps 72 are lighted if their associated output from the shift register 84 is low. That output will be low only if the main logic circuit 26 detects on a previous scan that the channel associated with that lamp was blocked. The main logic board sends the lamp data to the first receiver board in the concatenation and in series to the remaining boards. The down shift of the lamp data bits is opposite in direction to the shifting of the data bits from the receivers PTs indicating the presence or absence of light beams in the channels. When the lamp data for a particular beam is shifted down to the shift register position which corresponds to that particular beam then the visible LED associated with that beam is lit by the circuit. As a result the visible LED is lit only when its associated beam is blocked by penetration of an opaque object.

As desired, the control system for the light curtain could include additional indicator lights, not shown, to provide user status and other diagnostic information. For example, a separate control panel could be provided with diagnostic light indicators such red for a receiver fault, red for a transmitter fault, red for a power supply fault and yellow for an alignment problem. The control panel could also include status indicators such as yellow for indicating transmitter power levels, green to indicate a beam clear condition, red to indicate a beam blocked condition, and yellow to indicate that a channel select mode is active.

The channel select mode would allow the system to operate so that the guard zone electronically accepts objects such as tooling, fixtures or work pieces that are required for proper operation. The control circuit of the invention could be suitably modified so that, in the channel select mode, the visible LEDs are not lit when the desired fixtures, tooling and the like penetrate their associated channels. This would provide feedback information to the operator that the condition of the machine is proper for continued operation. In the event that the tool or fixture should slip down or otherwise move out of proper position, for example, then the operator can look at the receiver bar and see what the problem is from the change of the indicator lights. In other words, any change in the red indicator lights would mean to the operator that the machine and tooling are not in proper condition for continued cycling.

The invention also contemplates that the visible LED indicator lights could be operated to flash rather than be steadily lit to indicate blockage of a beam. Another modification that is within the scope of the invention is where the housings for the receivers or transmitter bars, as the case may be, are modified so that the indicator signals from the visible light LEDs pass through another bezel or a series of holes located adjacent the respective channels. Another such modification would be to mount a plurality of visible light LEDs for the indicator signals adjacent each channel or on opposite sides of the focusing lenses for each channel. This modification would increase the viewing angle so that the operator can see the indicator lights from different positions. A further such modification would be to provide a bezel having flat beveled edges which internally reflect or refract visible light from the LEDs sideways of the housing. This structure would be appropriate where the operator is standing to one side of the light curtain.

In the method of operation of the invention, when an opaque object penetrates one or more beams a control signal is generated which in turn generates a visible light signal from the LED or LEDs 72 associated with the blocked channels. The visible light signal from LEDs 72 is positioned adjacent the blocked channel and is in view by the operator. This provides continuous and positive feedback information to the operator as to the condition of the guarded zone. The appearance of one or more red lights informs the operator that the associated beams are blocked. During normal operation of the machine, the operator can follow the indicator lights as his hands and arms, or tools and work piece, move in and out of the light curtain when the machine operates through its cycle. The operator eventually becomes comfortable with this continuous feedback of information and recognizes from the sequence of indicator lights when the machine is properly operating. Should the indicator light conditions suddenly change, the operator is immediately alerted that the machine may be in an unsafe condition. Because the indicator lights follow the operator's motions through the machine, the operator can immediately sense when the lights go out of synchronization with those movements. In the case of any failure in the circuit, there is virtually no way that the sequence of indicator light operation will correctly follow movement of the operator's hands, tools and/or work piece through the light curtain.

The invention also greatly facilitates alignment of the light curtain when it is either being initially installed, replaced or adjusted around the machine. With the control circuit in operation, the technician can immediately tell when the receiver PTs are not in proper alignment with the infrared beams from the transmitter. As the transmitter and receiver bars are adjusted, the technician can see the play of light visible from the indicators and easily make the required adjustments. The invention also facilitates diagnosing problems in the light curtain system. Thus, the visible lights can be used to eliminate various possibilities as to whether there is a logic problem, optical problem, alignment problem or power supply problem. For example, if the operator's hand or other object is passed into the beam and the visible lights do not change, then it is likely a logic problem. If none of the visible lights are on then it is likely a power supply problem. If the visible lights are changing correctly responsive to penetration of the beams, but the red and green lights on a control panel are not changing correctly, then there is likely a logic problem in the circuit outside the receiver bar. If the visible lights indicate that a beam is continuously blocked while the remaining lights operate normally, then this could indicate that either the PT or LED for that beam is defective. This condition could also indicate that there is some other blockage, such as from spurious material spewed from the machine. This information permits the technician to assess the problem and decide what to replace or repair.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A light curtain system for establishing a guard zone along a machine which is controlled by a human operator, the light curtain system comprising the combination of light transmitter means for transmitting light beams along a plurality of parallel channels which extend across at least a portion of the guard zone, light receiver means for receiving and detecting the presence and absence of light beams at a predetermined location on a side of the guard zone which is opposite the light transmitter means, indicator light signal means for displaying visible light signals at signaling positions which are adjacent respective channels with the signaling positions being in the operator's range of sight, beam control means for controlling the light transmitter means to transmit light beams in a predetermined timed sequence along the channels, receiver control means for enabling the light receiver means to detect in synchronism with said predetermined timed sequence a light beam being present or absent in a channel which corresponds to a light beam being transmitted for such channel, and indicator control means for controlling said light signal means to display a visible light signal at a signaling position which is adjacent a channel in which the receiver control means detects the absence of a light beam when the light receiver means is enabled for such channel whereby the operator can be alerted by observing from the presence of a light signal that a channel is blocked.

2. A light curtain system as in claim 1 in which said indicator control means comprises shift register means for generating a series of data bits which correspond to the presence or absence of light beams which are detected in respective channels, said shift register means shifting said data bits along a series of data positions in synchronism with said timed sequence, and means for controlling the light signal means to display a light signa; at a signaling position responsive to a data bit at a data position corresponding to a channel in which the light receiver means detects that a light beam is absent.

3. A light curtain system as in claim 1 in which said light receiver means comprises a plurality of light receivers, means for mounting the light receivers in spaced-apart relationship along said predetermined location of the guard zone, said indicator light signal means comprises a plurality of indicator lamps, and means for mounting the indicator lamps adjacent to respective light receivers with the lamps emitting said visible light signals at substantially the location of the channel in which the absence of a light beam is detected by said light receiver means.

4. A light curtain system as in claim 3 in which said light receivers each comprise a phototransistor together with focusing lens means for focusing a light beam from the channel which is associated therewith onto the phototransistor, and said indicator lamps for each light receivers are mounted adjacent to respective focusing lens means.

5. A light curtain system as in claim 3 in which said means for mounting the light receivers comprises a housing having a window panel of a material transparent to the light beams and to the visible light, said light receivers are mounted within the housing behind the window panel and with each receiver aligned with a respective light beam, said indicator lamps are mounted within the housing behind the window panel at positions where visible light emitted from the lamps can be viewed through the window panel by the operator.

6. A method of controlling the operation of a light curtain system for use in establishing a guard zone along a machine which is controlled by a human operator, the system having a transmitter which sequentially transmits beams of light along parallel channels across at least a portion of the guard zone to a receiver which detects the presence or absence of light beams in the channels, the method comprising the steps of generating a control signal responsive to the detection of an absence of a light beam in any channel, generating a visible light signal responsive to the control signal, positioning the visible light signal adjacent the channel in which the absence of a light beam is detected with the light signal being in view by the operator so that the operator can be alerted by observing from the presence of a light signal that a channel is blocked.

7. A method as in claim 6 in which the step of generating the light signal comprises energizing a visible light-emitting lamp and the step of positioning the light signal comprises holding the lamp adjacent the receiver at the position thereon of the channel in which the absence of a light beam is detected.

* * * * *